(12) United States Patent
D'Armancourt

(10) Patent No.: US 10,369,804 B2
(45) Date of Patent: Aug. 6, 2019

(54) SECURE THERMAL PRINT HEAD

(71) Applicant: Datamax-O'Neil Corporation, Orlando, FL (US)

(72) Inventor: Sébastien Michel Marie Joseph D'Armancourt, Singapore (SG)

(73) Assignee: Datamax-O'Neil Corporation, Orlando, FL (US)

( * ) Notice: Subject to any disclaimer, the term of this patent is extended or adjusted under 35 U.S.C. 154(b) by 0 days.

(21) Appl. No.: 15/808,988

(22) Filed: Nov. 10, 2017

(65) Prior Publication Data
US 2019/0143712 A1 May 16, 2019

(51) Int. Cl.
G06F 21/44 (2013.01)
B41J 2/335 (2006.01)
H04L 9/32 (2006.01)

(52) U.S. Cl.
CPC ............ B41J 2/3352 (2013.01); G06F 21/44 (2013.01); H04L 9/3234 (2013.01)

(58) Field of Classification Search
CPC ... B41J 2/32; B41J 2/3352; B41J 2/355; B41J 29/38; B41J 29/387; B41J 2202/14; B41J 202/30; G06F 21/44; H04L 9/3234
See application file for complete search history.

(56) References Cited

U.S. PATENT DOCUMENTS

| | | | |
|---|---|---|---|
| 6,113,213 A * | 9/2000 | Hosaka | B41J 25/34 347/20 |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,372,475 B2 | 5/2008 | Vazac et al. | |
| 7,413,127 B2 | 8/2008 | Ehrhart et al. | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |

(Continued)

FOREIGN PATENT DOCUMENTS

WO 2013163789 A1 11/2013

*Primary Examiner* — Scott A Richmond
(74) *Attorney, Agent, or Firm* — Additon, Higgins & Pendleton, P.A.

(57) ABSTRACT

Methods and apparatus to detect if an authorized thermal print head (TPH) has been installed in a specific model or manufacturer printer are provided. The method provides a system to check the resistivity or impedance value at the TPH side, either upon printer boot-up or during printing operation. During printing operation, the impedance measurement may be executed for a time period at a fixed periodicity and/or one or more events. Based on the impedance measurement, the printer may determine that the impedance value matches the authorized TPH range value. In a case of non-matching impedance values or change of impedance values, the printer may prevent printing operation until an authorized TPH is installed.

14 Claims, 8 Drawing Sheets

(56) References Cited

U.S. PATENT DOCUMENTS

| | | |
|---|---|---|
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,864,277 B2 | 10/2014 | Rice et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |

(56) References Cited

U.S. PATENT DOCUMENTS

| | | |
|---|---|---|
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Wang |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van Horn et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,443,123 B2 | 1/2016 | Hejl |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,301,427 B2 | 3/2016 | Feng et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| D757,009 S | 5/2016 | Oberpriller et al. |
| 9,342,723 B2 | 5/2016 | Liu et al. |
| 9,342,724 B2 | 5/2016 | McCloskey |
| 9,361,882 B2 | 6/2016 | Ressler et al. |
| 9,365,381 B2 | 6/2016 | Colonel et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,360,304 B2 | 7/2016 | Chang et al. |
| 9,383,848 B2 | 7/2016 | Daghigh |
| 9,384,374 B2 | 7/2016 | Bianconi |
| 9,390,596 B1 | 7/2016 | Todeschini |
| D762,604 S | 8/2016 | Fitch et al. |
| 9,411,386 B2 | 8/2016 | Sauerwein |
| 9,412,242 B2 | 8/2016 | Van Horn et al. |
| 9,418,269 B2 | 8/2016 | Havens et al. |
| 9,418,270 B2 | 8/2016 | Van Volkinburg et al. |
| 9,423,318 B2 | 8/2016 | Lui et al. |
| D766,244 S | 9/2016 | Zhou et al. |
| 9,443,222 B2 | 9/2016 | Singel et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,536,112 B2 | 1/2017 | Neo et al. |
| 9,558,386 B2 | 1/2017 | Yeakley |
| 9,572,901 B2 | 2/2017 | Todeschini |
| 9,606,581 B1 | 3/2017 | Howe et al. |
| D783,601 S | 4/2017 | Schulte et al. |
| D785,617 S | 5/2017 | Bidwell et al. |
| D785,636 S | 5/2017 | Oberpriller et al. |

(56) References Cited

U.S. PATENT DOCUMENTS

| | | |
|---|---|---|
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 2006/0098993 A1 | 5/2006 | Yang |
| 2007/0063048 A1 | 3/2007 | Havens et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2012/0317662 A1* | 12/2012 | Neo ............... G06F 21/44 726/34 |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0332524 A1 | 12/2013 | Fiala et al. |
| 2014/0001267 A1 | 1/2014 | Giordano et al. |
| 2014/0002828 A1 | 1/2014 | Laffargue et al. |
| 2014/0025584 A1 | 1/2014 | Liu et al. |
| 2014/0100813 A1 | 1/2014 | Showering |
| 2014/0034734 A1 | 2/2014 | Sauerwein |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078342 A1 | 3/2014 | Li et al. |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0125853 A1 | 5/2014 | Wang |
| 2014/0125999 A1 | 5/2014 | Longacre et al. |
| 2014/0129378 A1 | 5/2014 | Richardson |
| 2014/0131443 A1 | 5/2014 | Smith |
| 2014/0131444 A1 | 5/2014 | Wang |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0168787 A1 | 6/2014 | Wang et al. |
| 2014/0175165 A1 | 6/2014 | Havens et al. |
| 2014/0191913 A1 | 7/2014 | Ge et al. |
| 2014/0197239 A1 | 7/2014 | Havens et al. |
| 2014/0197304 A1 | 7/2014 | Feng et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0351317 A1 | 11/2014 | Smith et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0009338 A1 | 1/2015 | Laffargue et al. |
| 2015/0014416 A1 | 1/2015 | Kotlarsky et al. |
| 2015/0021397 A1 | 1/2015 | Rueblinger et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0049347 A1 | 2/2015 | Laffargue et al. |
| 2015/0051992 A1 | 2/2015 | Smith |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0088522 A1 | 3/2015 | Hendrickson et al. |
| 2015/0096872 A1 | 4/2015 | Woodburn |
| 2015/0100196 A1 | 4/2015 | Hollifield |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0149946 A1 | 5/2015 | Benos et al. |
| 2015/0161429 A1 | 6/2015 | Xian |
| 2015/0186703 A1 | 7/2015 | Chen et al. |
| 2015/0199957 A1 | 7/2015 | Funyak et al. |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0310243 A1 | 10/2015 | Ackley |
| 2015/0310389 A1 | 10/2015 | Crimm et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0092805 A1 | 3/2016 | Geisler et al. |

(56) References Cited

U.S. PATENT DOCUMENTS

| | | |
|---|---|---|
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr et al. |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Linwood |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | DiPiazza et al. |
| 2016/0192051 A1 | 6/2016 | DiPiazza et al. |
| 2016/0125873 A1 | 7/2016 | Braho et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggert et al. |
| 2016/0204636 A1 | 7/2016 | Allen et al. |
| 2016/0204638 A1 | 7/2016 | Miraglia et al. |
| 2016/0316190 A1 | 7/2016 | McCloskey et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Geramine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschinie et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Jonas et al. |
| 2017/0193727 A1 | 7/2017 | Van Horn et al. |
| 2017/0200108 A1 | 7/2017 | Au et al. |
| 2017/0200275 A1 | 7/2017 | McCloskey et al. |

\* cited by examiner

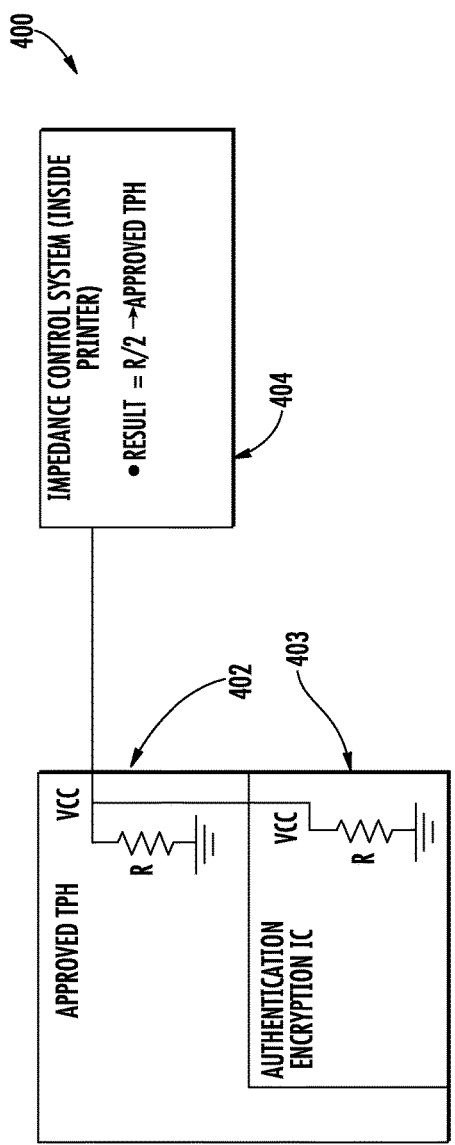
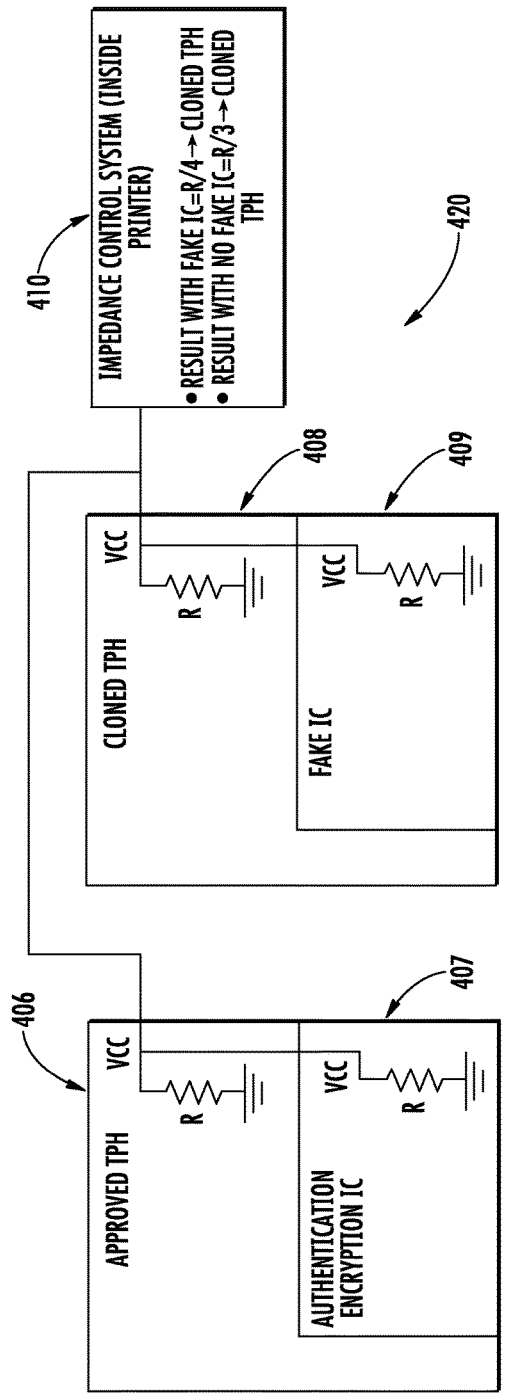
FIG. 4A
FIG. 4B

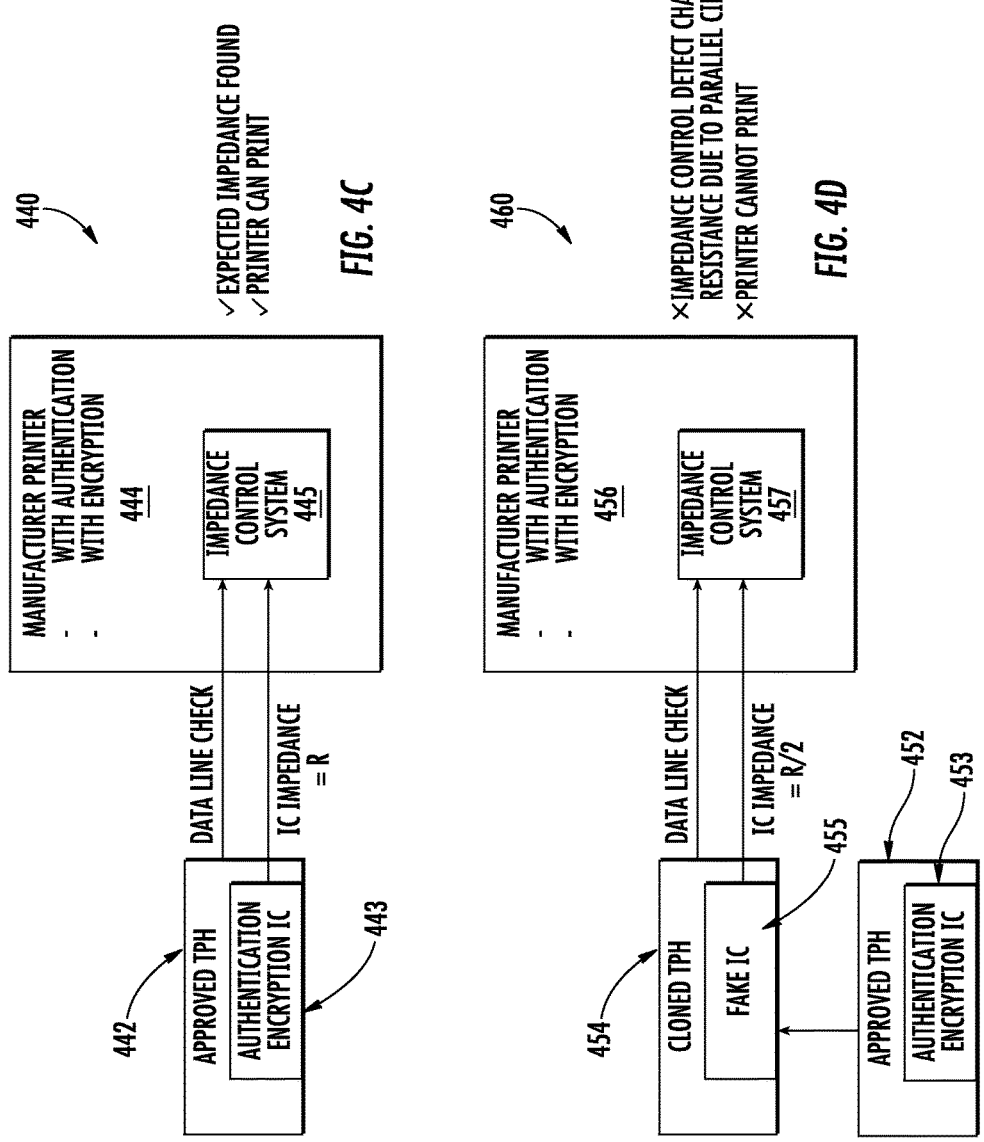

SECURE THERMAL PRINT HEAD

FIELD OF THE INVENTION

The present invention relates to improvements in printers, and more particularly, for apparatus and methods for preventing the use of an unauthorized thermal print head (TPH) in a printer of a specific brand.

BACKGROUND

Generally speaking a thermal print head (TPH) is a consumable product sold by thermal printer manufacturer companies. Each printer may have a set of compatible TPHs which are exclusively sold by the printer manufacturer. This may mean that no third parties are accepted in the printer.

Nevertheless, there may be a side market which sells unauthorized TPHs at a cheaper price and which may be recognized to be a valid and compatible TPH by the printer in spite of various security measures that may be incorporated in the printer. These security measures may be intended to prevent the use of unauthorized THPs in the printer. The unauthorized THPs may represent a direct loss of sales for the printer company since they are not selling their own proprietary TPHs.

In addition, placing an unauthorized TPH inside the printer may represent a certain level of risk (poor performance, electrical damage to the printer, etc. . . . ) for the user since the unauthorized TPH was not qualified to work properly with the printer.

Therefore, a need exists for a method and apparatus that may prevent the use of unauthorized TPHs in a printer.

SUMMARY

The present invention embraces methods and apparatus to detect if an authorized thermal print head (TPH) has been installed in a specific model or manufacturer printer. The method provides a system to check the resistivity or impedance value at the TPH side, either upon printer boot-up or during printing operation. During printing operation, the impedance measurement may be executed for a time period at a fixed periodicity and/or one or more events. Based on the impedance measurement, the printer may determine that the impedance value matches the authorized TPH range value. In a case of non-matching impedance values or change of impedance values, the printer may prevent printing operation until an authorized TPH is installed. This solution may be simple, reliable, cost effective and may only require minimal circuitry on the printer side.

In an exemplary embodiment, a printer may comprise a thermal print head; an authentication encryption integrated circuit (IC) associated with the thermal print head; and an impedance control system, coupled to the thermal print head and authentication encryption integrated circuit (IC), configured to measure an impedance of one or more points of the thermal print head and the authentication encryption integrated circuit (IC). Based on the measured impedance, measured at start-up and measured over a time period, the impedance control system determines whether the thermal print head is authorized or not. If the impedance control system determines the thermal print head is not authorized, the impedance control system then prevents a printing operation.

In another aspect, the printer may operate as follows: At start-up, if the measured impedance is equal to a predetermined value, the thermal print head is authorized. At start-up, if the measured impedance is not equal to the predetermined value, and if an impedance measurement condition is completed, then the impedance control system prevents the printing operation. If the impedance measurement condition is not completed, the impedance control system repeats the impedance measurement. If a first impedance of internal circuitry for the authentication encryption integrated circuit (IC) is R and a second impedance of internal circuitry for one of the one or more points of the thermal print head is R, and the first internal circuitry and second internal circuitry are coupled in parallel, then the predetermined value is R/2±a margin. If variations of the measured impedance over the time period exceed a threshold, then the thermal print head is not authorized. The one or more points of the thermal print head comprises thermal printer head power (VCC), authentication IC data line, and thermal print head data lines.

In another exemplary embodiment, a system may comprise a thermal print head, comprising an authentication encryption integrated circuit (IC); another thermal printer head, comprising another authentication encryption integrated circuit (IC); and an impedance control system, associated with a printer, configured to measure an impedance of the thermal print head and the another thermal printer head. Based on the measured impedance, measured at start-up and measured over a time period, the impedance control system determines whether at least one of thermal print heads is not authorized. If the impedance control system determines that the at least one of the thermal print head is not authorized, the impedance control system prevents a printing operation.

In another aspect, the system may operate as follows: The thermal print head is authorized: (1) if only the thermal print head is coupled to the impedance control system, and (2) if the measured impedance of the thermal print head and of the authentication encryption integrated circuit (IC) equals a predetermined value. After initial authorization of the thermal print head, the printing operation is initiated and the impedance, and control system continues to monitor the measured impedance at a fixed periodicity and/or one or more events. If the measured impedance exceeds a threshold, the printing operation terminates. If impedance of the authentication encryption integrated circuit (IC) is R and the impedance of the thermal print head is R, then the predetermined value is R/2±a margin.

Additionally, the system may operate as follows: if the thermal print head and the another thermal print head are coupled in parallel to the impedance control system, if the thermal print head is authorized, and if the measured impedance of the thermal print head and the another thermal print head do not equal a predetermined value, then the another thermal print head is not authorized. If impedance of the thermal print head is R, and impedance of its associated authentication encryption integrated circuit (IC) is R, and if impedance of the another thermal print head is R, and impedance of its associated another authentication encryption integrated circuit (IC) is R, then, if the measured impedance is R/4, the another authentication encryption integrated circuit (IC) is a fake IC, and if the measured impedance is R/3, the another authentication encryption integrated circuit (IC) is not a fake IC.

In yet another exemplary embodiment, a method may comprise the following steps: authenticating a printer; activating encryption of the printer; measuring, at start-up, at the printer, a first impedance of a thermal print head and an authentication encryption integrated circuit (IC); initiating, at the printer, a printing operation if the measured first impedance of the thermal print head and the authentication encryption integrated circuit (IC) equals a predetermined value; and continuing, at the printer, the printing operation if subsequent impedance measurements of the thermal print head and the authentication encryption integrated circuit (IC), measured after start-up, equal the predetermined value.

In another aspect, the method may comprise the following steps: not initiating, at the printer, the printing operation if the first impedance does not equal the predetermined value; repeating the impedance measurement if the first impedance does not equal the predetermined value, and if an impedance measurement condition is not completed; terminating the printing operation if the first impedance does not equal the predetermined value, and if an impedance measurement condition is completed; terminating the printing operation if variations of the subsequent impedance measurements exceed a threshold relative to the predetermined value; and executing the subsequent impedance measurements of the thermal print head and its authentication encryption integrated circuit (IC) for a time period at a fixed periodicity and/or one or more events.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIGS. 4A and 4B illustrate an exemplary system to detect if an authorized TPH has been installed in a printer.

FIGS. 4C and 4D illustrate another exemplary system to detect if an authorized TPH has been installed in a printer.

DETAILED DESCRIPTION

The present invention embraces methods and apparatus to detect if an authorized thermal print head (TPH) has been installed in a specific model or manufacturer printer. The method provides a system to check the resistivity or impedance value at the TPH side, either upon printer boot-up or during printing operation. During printing operation, the impedance measurement may be executed for a time period at a fixed periodicity and/or one or more events. Based on the impedance measurement, the printer may determine that the impedance value matches the authorized TPH range value. In a case of non-matching impedance values or change of impedance values, the printer may prevent printing operation until an authorized TPH is installed. This solution may be simple, reliable, cost effective and may only require minimal circuitry on the printer side.

In one exemplary embodiment, the method may prevent use of third party/unauthorized/cloned TPH in thermal printers when the third party TPH uses a parallel connection for bypassing a boot-up check by connecting the encryption IC of authorized TPH to a third party TPH. The thermal printer may continuously monitor and measure the impedance value of one or more points of the TPH. Based on the variation in measured impedance values, the thermal printer may identify whether the TPH used in the printer may be genuine or not. Upon detection of an unauthorized TPH, the printer may prevent the operation of printing functions. The present invention may utilize impedance, current, and/or voltage to detect unauthorized TPHs.

The terms "third party TPH", "unauthorized TPH", and "cloned TPH" may be equivalent terms, as used herein. The terms "approved TPH" and "authorized TPH" may be equivalent terms, as used herein. The term "manufacturer printer" may be equivalent to a printer of a specific brand, e.g., a Honeywell printer.

Figure 1:
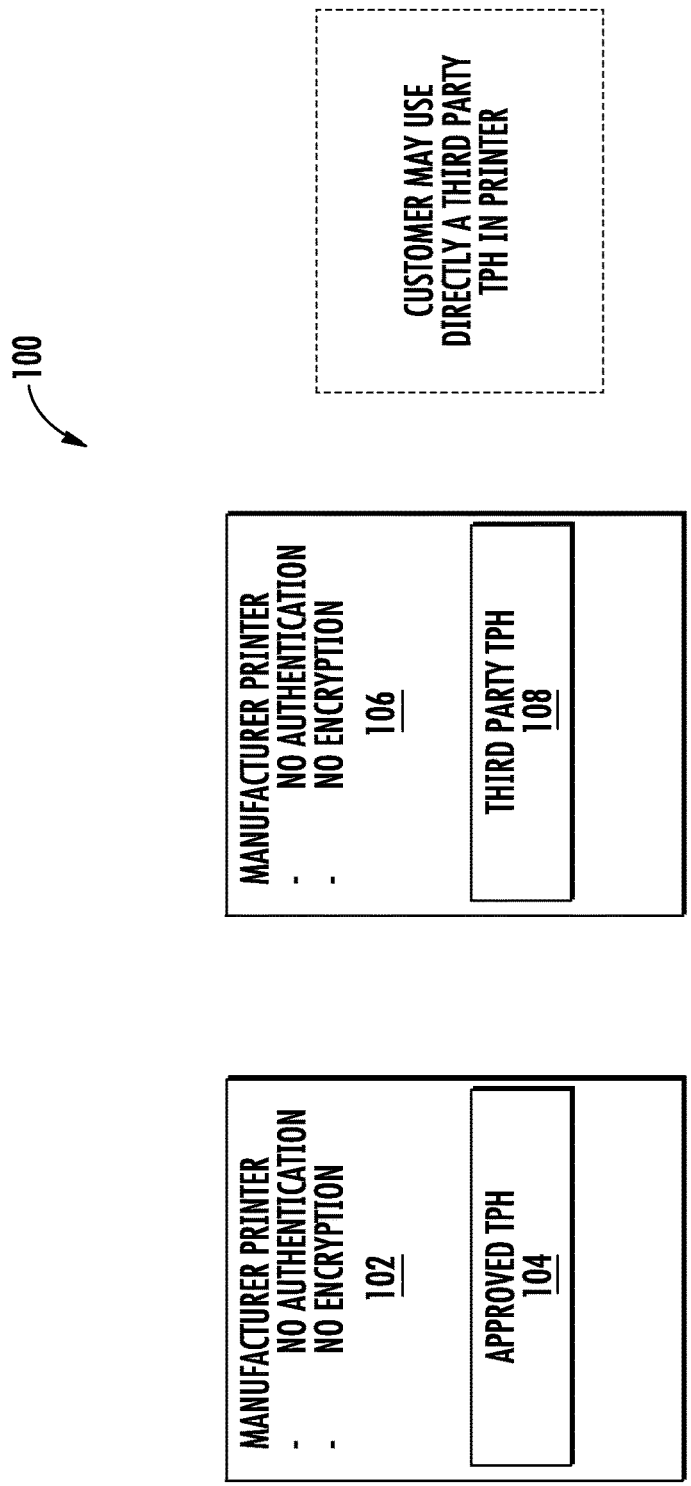
FIG. 1 illustrates a third party thermal print head (TPH) and a manufacturer printer with no authentication or security features.

In FIG. 1, embodiment 100, manufacturer printer 102 comprises no security or authentication features and includes an approved TPH 104. As such, manufacturer printer 102 may start and continue a printing operation without any issues.

A number of methods and apparatus have been utilized by third parties to allow the use a cloned TPH in a specific manufacturer printer instead of the manufacturer's authorized TPH. Generally, there have been three types manufacturer printer. These methods and apparatus for utilizing an unauthorized TPH in these three types manufacturer printer are discussed below.

In a first type, per FIG. 1, a manufacturer printer 106 may have no security or authentication features. A third party TPH 108, without security or authentication features, may be used directly in the printer.

In a second type, in an attempt to prevent the first type, an authorized TPH may comprise an authentication option, but without encryption. Usually a serial number may be written in an embedded memory (EEPROM in most cases) inside the authorized TPH. In this situation, the third party may need to obtain an authorized TPH to read the content of the memory of the authorized TPH and write the exact same data in the third party's own unauthorized TPH. Once completed, the third party TPH may be used by the printer.

Figure 2:
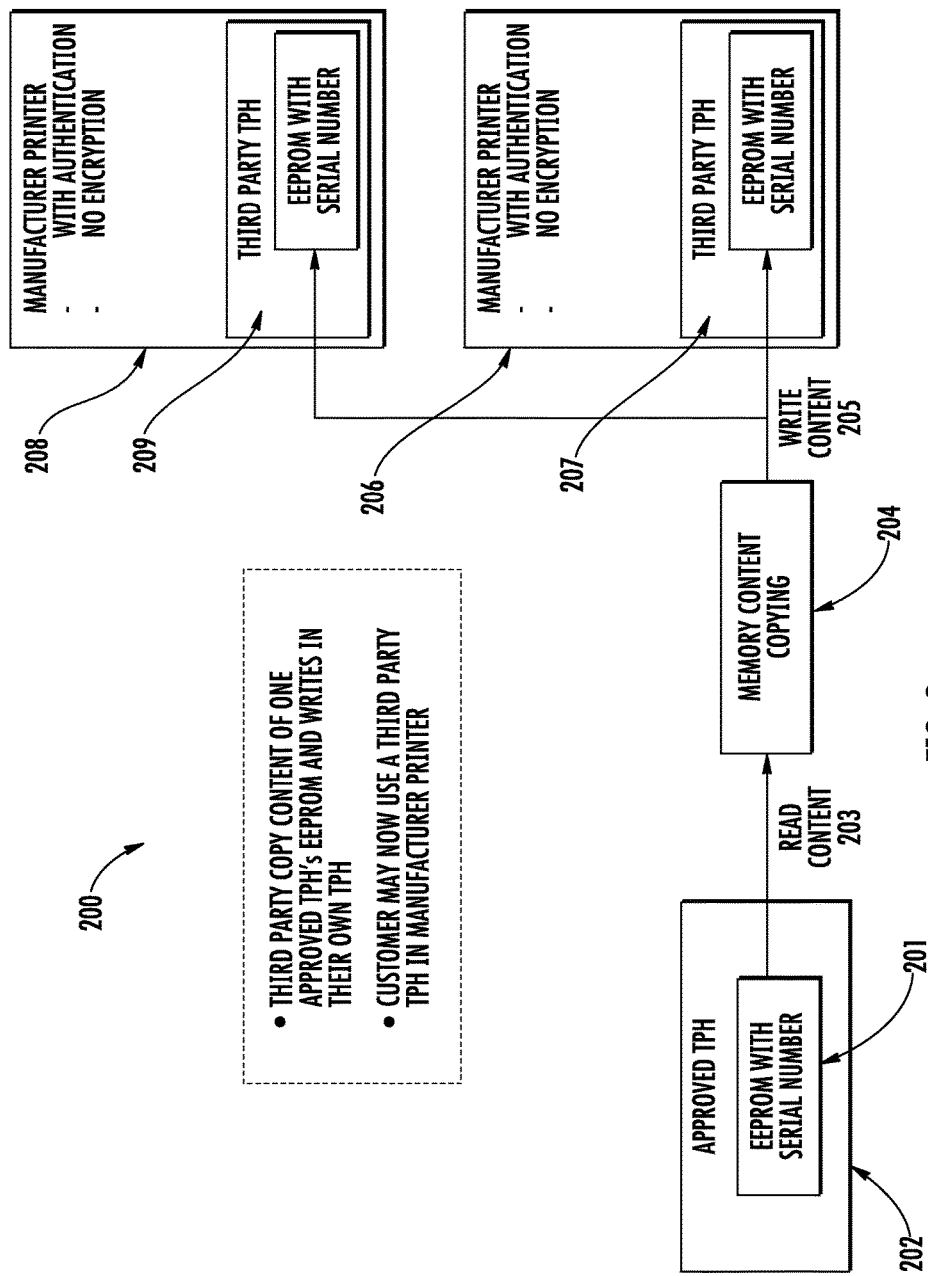
FIG. 2 illustrates a third party TPH and a manufacturer printer with only authentication features but no encryption features.

FIG. 2, embodiment 200, illustrates the second type of manufacturer printer in which the manufacturer printer includes authentication features but no encryption features. A third party acquires an approved TPH 202, including an EEPROM with serial number 201. The third party reads content 203 with a device, memory content copying 204. The third party may then write content 205 into the EEPROM with serial number of third party TPH 207 and EEPROM with serial number of third party TPH 209. Third party TPH 207 may be successfully used in manufacturer printer 206 and third party TPH 209 may be successfully used in manufacturer printer 208.

In an attempt to prevent the problems of the first and second types of manufacturer printers, the third manufacturer printer incorporates an encrypted authentication feature. Since clear authentication may not be sufficient, the industry has moved to use encrypted authentication. This type of TPH may include an embedded Integrated Chip (IC), which may communicate with the printer CPU. Upon printer boot-up, there may be some exchange of encrypted data between printer CPU and TPH to identify that an unauthorized TPH is installed and to determine the TPH model. The data exchange may only happen upon printer start-up and not during the subsequent operation.

A third party may attempt to avoid this security by connecting in parallel the unauthorized TPH, or the needed security circuitry only, with their own unapproved third party TPH. That is, the third party TPH may use a parallel connection for bypassing a boot-up check by connecting the encryption IC of original TPH to a third party TPH. Upon printer boot-up, the printer CPU may still communicate with the emulated IC from the unauthorized TPH, and once security is approved, the user may be able to use the third party TPH.

Figure 3:
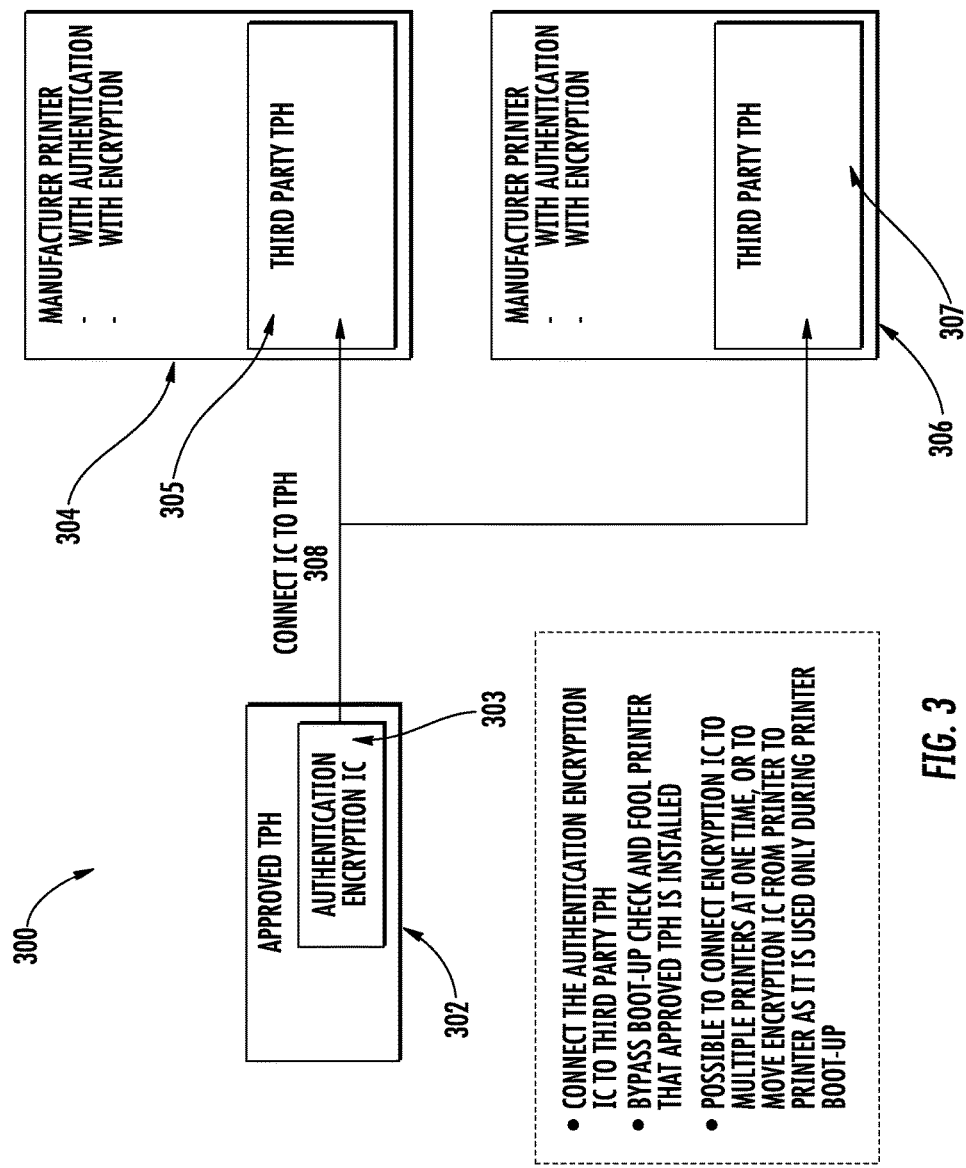
FIG. 3 illustrates a third party TPH and a manufacturer printer with encrypted authentication features.

FIG. 3, embodiment 300, illustrates a manufacturer printer with encrypted authentication features. The approved TPH 302 with authentication encryption IC 303 may be connected to the third party TPH 305 and third party TPH 307. Third party TPH 305 may be installed in manufacturer printer 304 and third party TPH 307 may be installed in manufacturer printer 306.

By connecting the authentication encryption IC 303 to third party TPH 305 (or third party TPH 307), boot-up check may be bypassed and manufacturer printer 304 may be convinced ("fooled") that an authorized TPH is installed. It may be possible to connect authentication encryption IC 303 to multiple printers at one time, or to move authentication encryption IC 303 from printer to printer as it may be used only during printer boot-up. See connect IC to TPH 308 in FIG. 3.

In an exemplary embodiment of preventing the use of unauthorized TPHs, the manufacturer printer may continuously monitor the impedance value of one or more points of the printer TPH, measuring, for example, but not limited to, points such as TPH power line, authentication IC data line, TPH data line etc. Based on the variation in impedance values, the thermal printer may identify whether the printer TPH used in the manufacturer printer may be genuine or not and upon detection of an unauthorized TPH, the manufacturer printer may prevent printing functions.

In the solution provided, the manufacturer printer may make use of both software and hardware information to detect if an authorized TPH has been installed in the printer. On the software side, the encrypted authentication IC may be included. The novelty may reside on the hardware side where the printer may make use of impedance, current and voltage control.

The manufacturer printer may monitor the impedance value to a known characteristic, and may also check that the impedance value does not vary over time when the printer is powered and in operation. When a printer TPH is connected to the manufacturer printer, the printer TPH may have a certain impedance. As previously noted, this resistive value may be measured at one or several points, for example, but not limited to, the TPH power line (VCC), authentication IC data line and the TPH data line.

When a user desires to clone a manufacturer's (authorized) TPH by placing an unauthorized TPH in parallel, the resistive value may be modified from its original value based on an authorized TPH:

$$R_{parallel}=(R1R2)/(R1+R2)$$

where,

R1 being the impedance of the approved TPH 302
R2 the impedance of the cloned TPH 408
The result of the two impedances becomes $R_{parallel} \neq R1$ FIGS. 4A and 4B illustrate exemplary methods to detect if an authorized TPH has been installed in a printer. FIG. 4A shows one exemplary embodiment 400 of an impedance measurement of the power, VCC. Approved TPH 402 comprises an impedance of R for the internal circuitry related to VCC of the approved TPH 402. The impedance for authentication IC 403 may be also R. An impedance control system 404, which is located inside a manufacturer printer (i.e., specific brand), measures the VCC impedance. The result of the impedance measurement: R/2. If the measured impedance=R/2, then the measured TPH may be approved TPH 402, i.e., an authorized TPH.

FIG. 4B shows another exemplary embodiment 420 of an impedance measurement of the power, VCC. As shown, approved TPH 406 comprises an impedance of R for the internal circuitry related to VCC of the approved TPH 406. The impedance for authentication encryption IC 407 may be also R. Impedance control system 410, which is located inside a manufacturer printer, may measure the VCC impedance.

Connected in parallel with the approved TPH 406 may be cloned TPH 408. Cloned TPH 408 may comprise an impedance value related to the internal circuitry of VCC of R. Cloned TPH 408 also may comprise a, IC 409, which comprises an impedance of R related to the internal circuitry for VCC. IC 409 may have a fake IC, or not. As used herein, "IC" is an abbreviation for "authentication encryption IC".

As illustrated, impedance control system 410 is an element of a manufacturer printer. Impedance control system 410 may measure the collective impedance of approved TPH 406 and cloned TPH 408 for VCC. The impedance measurement may have a range, such as a value is within +/−10%. Tighter tolerance of +/−3% may also be chosen to restrict even more the possibility of having counterfeit TPH matching our impedance. Lower tolerances may result in false detection.

The results of this impedance measurement may include:

(1) Impedance measurement=R/4. This measurement may mean the cloned TPH is an unauthorized TPH and comprising IC 409 that is a fake IC.

(2) Impedance measurement=R/3. This measurement may mean the cloned TPH is an unauthorized TPH and comprises IC 409 that is not a fake IC.

Figure 5A:
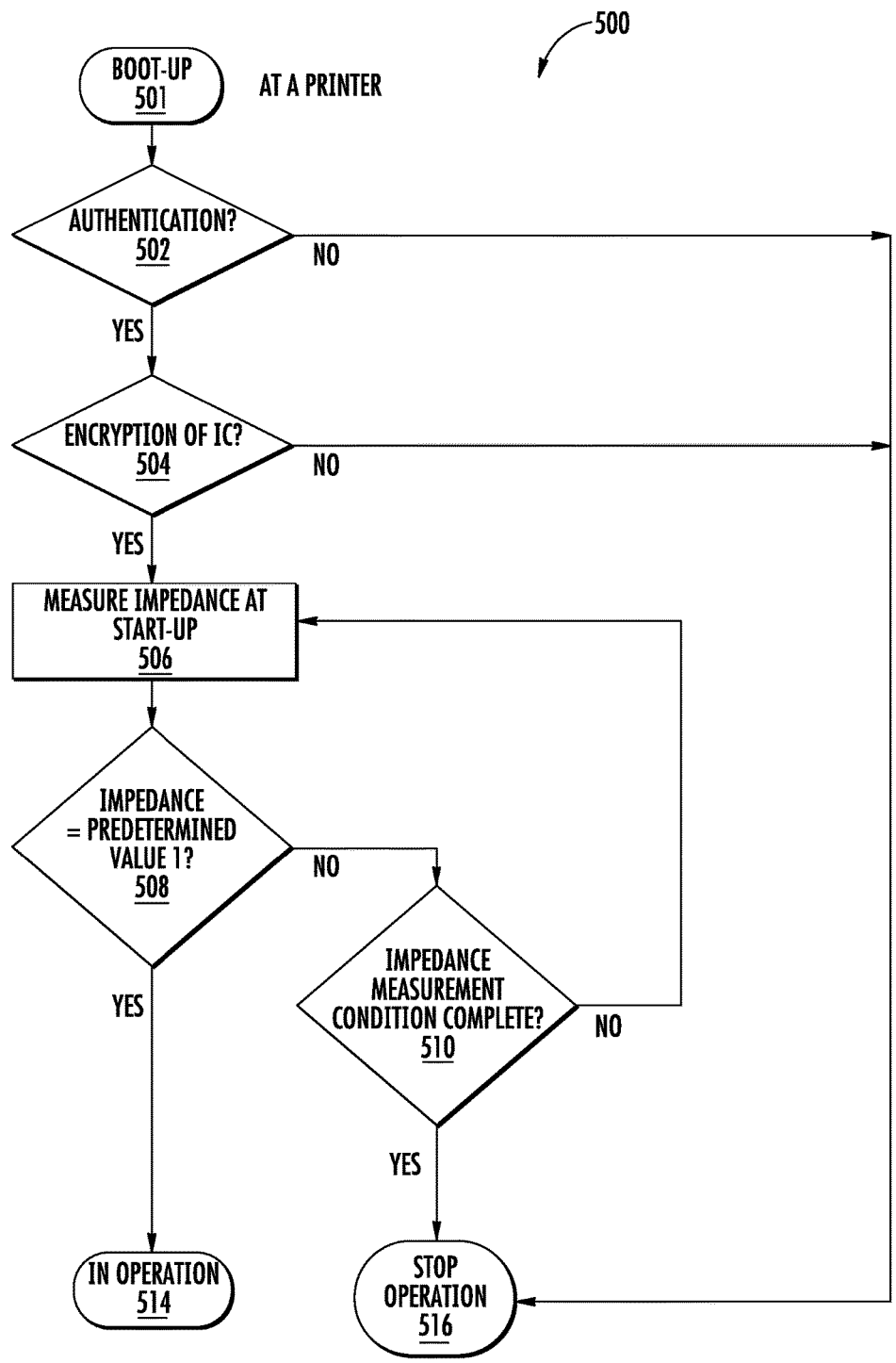
FIGS. 5A, 5B, and 5C illustrate flowcharts of an exemplary method of detecting the presence of an authorized party TPH.

Impedance values of R, R/2, R/3, R/4, as described herein, may be designated predetermined values. For example, in FIG. 4C, R/2 is the predetermined value of impedance to detect an authorized TPH. In FIG. 5A, R/2 may be the predetermined value1 (first predetermined value), R/3 may be the predetermined value2 (second predetermined value), and R/4 may be predetermined value3 (third predetermined value)

FIGS. 4C and 4D illustrate exemplary methods to detect if an authorized TPH has been installed in a printer. FIG. 4C shows one exemplary embodiment 440 comprising manufacturer printer 444 having authentication and encryption, impedance control system 445, which is a component of manufacturer printer 444, and approved TPH 442 that is associated with authentication encryption IC 443. The authentication encryption IC 443 and a data line check signal are coupled to the impedance control system 445. The impedance control system 445 may determine an IC impedance of R and information read during the authentication and encryption check. Accordingly, the impedance control system 445 may determine that the authentication/encryption was valid and an expected (or predetermined) value of impedance was measured. From this information, the impedance control system 445 may allow the printing operation to start or continue.

FIG. 4D shows an exemplary embodiment 460 comprising manufacturer printer 456 having authentication and encryption, impedance control system 457m which is a component of manufacturer printer 456, approved TPH 452 that is associated with authentication encryption IC 453, and cloned TPH 454 associated with fake IC 455. In the exemplary embodiment 460, approved TPH 452 is coupled to cloned TPH 454, which in turn is coupled to the impedance control system 457. The impedance control system 457 receives a data line check signal from cloned TPH 454 and IC impedance information from fake IC 455. The value of the IC impedance is R/2. Since the expected impedance is R, as was the case for FIG. 4C, the impedance control system 457 determines that manufacturer printer 456 is connected to an unauthorized TPH, i.e., cloned RPH 454. The data line check signal provides information on the authentication and encryption check to the impedance control system 457. From this information, the impedance control system 457 may not allow the printing operation to start or continue.

Other solutions may be provided by recording the impedance over a time period. For example, if the impedance value changes when the printer is powered on, the printer may be prevented from starting an operation. In term of timing, a safe rule would be check of TPH impedance just before to print a label. In this case, the check only happens when customer want to print (once per label). Another option may be to check the impedance before attempting to print each line on the label. Another option may be to check the impedance at a fixed periodicity, for example, every 100 ms. Yet another option maybe to check the impedance based on an event or series of events. The shorter the time, the less possible it may be to swap the TPH or to use a counterfeit TPH.

Situation when the impedance value may suddenly change may include, but not limited to the following:

(1) The user may disconnect the authorized TPH to use it in another printer, leaving only the unauthorized TPH. In this case the impedance value may suddenly increase (2) The user may first connect only the authorized TPH in order to pass the printer boot-up check. Then the user may disconnect the authorized TPH and place the unauthorized TPH in the manufacturer printer. The impedance value may increase to infinite when the authorized TPH is disconnected, before the impedance returns to a certain impedance value (3) The user may connect only the authorized TPH to bypass the printer boot-up check. Then the user may connect the unauthorized TPH. At this point the impedance value may suddenly drop.

The term "sudden" generally indicates a significant or drastic change, i.e., a change detected from what is expected. In term of timing, a safe rule would be check of TPH impedance just before to print a label. In this case, the check only happens when customer want to print (once per label).

In the aforementioned situations, by monitoring the change of impedance value when the printer is functioning may allow to add a new level of security check which may trigger the printer to indicate that an unauthorized TPH is installed. In a similar fashion, a user may also implement an added solution to monitor the voltage and current value between the printer and its TPH in order to detect any unapproved range and determine whether a cloned TPH may be installed in place of the unauthorized TPH.

In summary, the manufacturer printer may monitor the impedance value to a known characteristic, and may also check that the impedance value does not vary over time when the printer is powered and in operation.

Figure 5B:
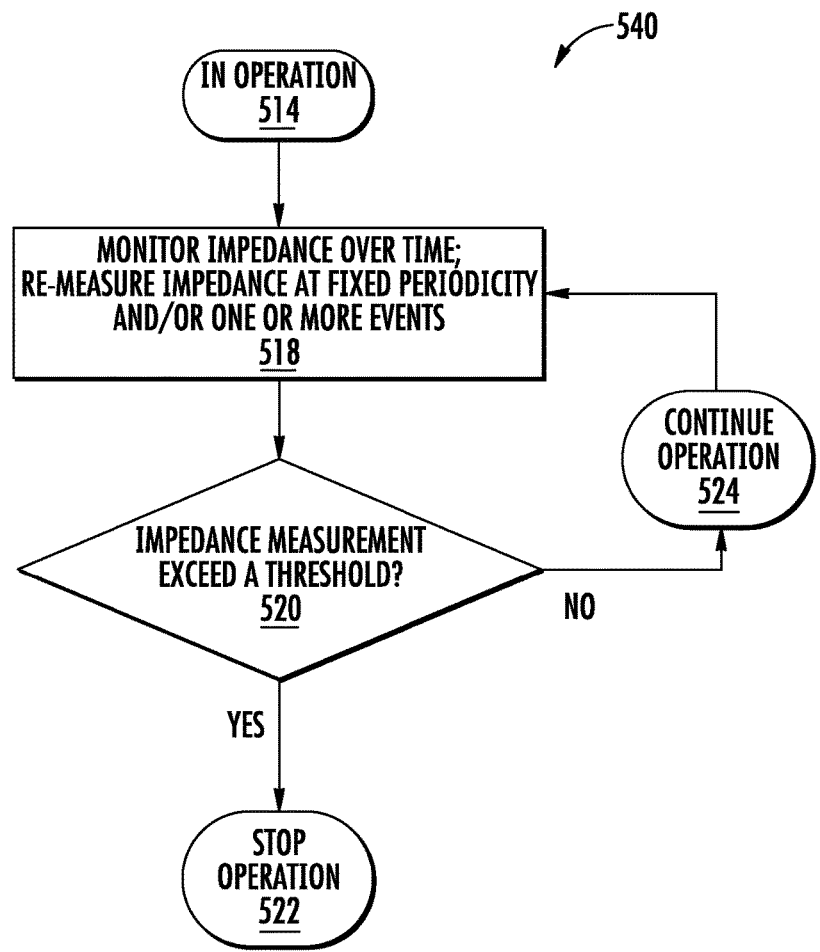
Figure 5C:
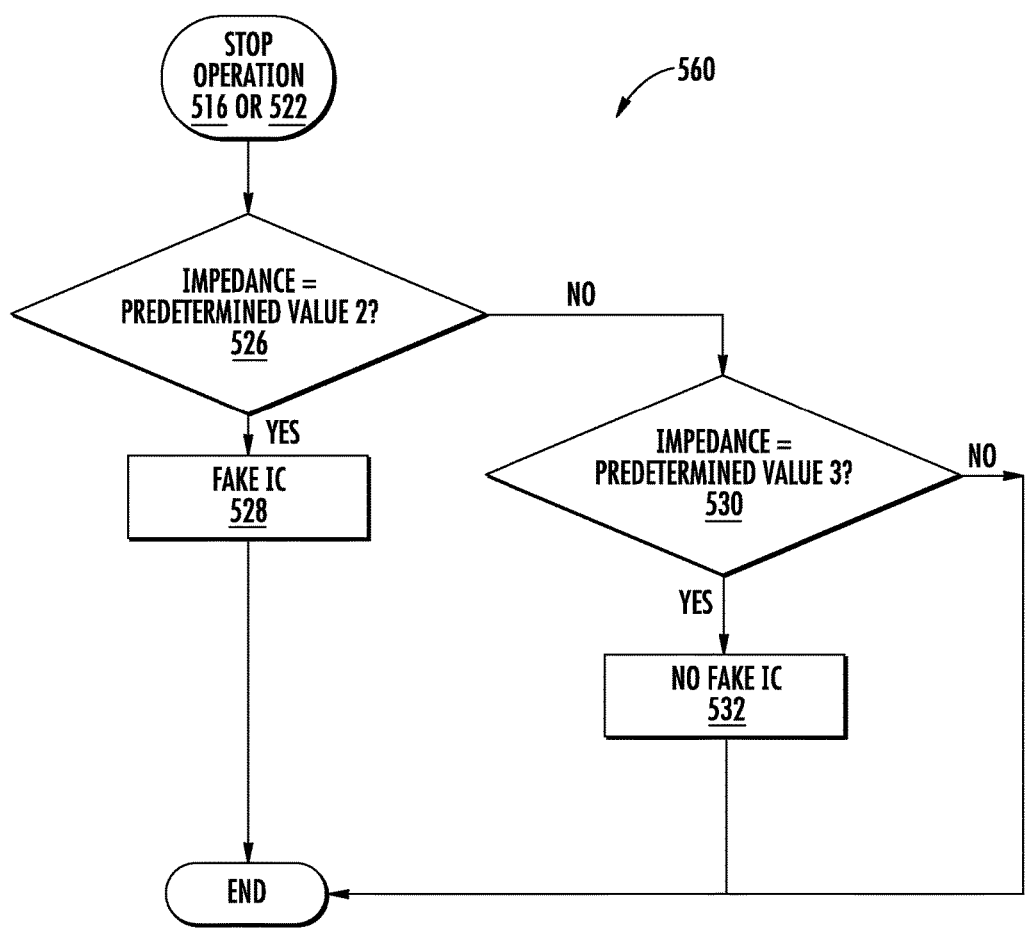

FIGS. 5A, 5B, and 5C illustrate flowcharts 500, 540 and 560, respectively, of exemplary methods of detecting the presence of an authorized party TPH.

The method illustrated in flowchart 500 comprises the following steps at a printer:

Booting-up or starting up the printer (step 501)
Authenticating the printer (step 502)
Activating encryption of the printer (step 504)

Measuring, at start-up, a first impedance of a TPH and an authentication encryption integrated circuit (IC) (step 506)

If the measured first impedance equals a predetermined value (step 508), start-up a printing operation (step 514)

If the measured first impedance does not equal a predetermined value, is an impedance measurement condition completed? (step 510) The impedance measurement condition defines measurement conditions for a subsequent re-check after failing an initial impedance check. These conditions may include, but not limited to, continuing to re-check for a period of time or continuing to re-check if the delta/variations between the measured impedance and the predetermined value impedance are within a certain margin.

If the impedance measurement condition is completed, stop/terminate the printing operation since the measured TPH is not an authorized TPH. (step 516)

If the impedance measurement condition is not completed (step 510), repeat step 506 to re-measure the first impedance of the TPH and an authentication encryption integrated circuit. (steps 510 and 506)

The method illustrated in FIG. 5B, flowchart 540 comprises the following steps at a printer while in printing operation. Beginning with step 514:

Monitoring the measurement of impedance over time. Re-measuring impedance at a fixed periodicity and/or one or more events. (step 518)

If the impedance measurement exceeds a threshold (step 520), stop/terminate the printing operation since the measured TPH is not an authorized TPH. (step 522)

If the impedance measurement does not exceed a threshold (step 520), continue the printing operation (step 524) and repeat step 518, to continue monitoring and re-measuring the impedance (step 518)

The method illustrated in FIG. 5C, flowchart 560, comprises the following steps at a printer after step 516 or after step 522, stop printing operation:

If the impedance is equal to a second predetermined value (step 526), then the authentication encryption integrated circuit (IC) is a fake IC (step 528)

If the impedance is not equal to a second predetermined value (step 526), then is the impedance equal to a third predetermined value? (step 530)

If the impedance is equal to a third predetermined value? (step 530), then the authentication encryption integrated circuit (IC) is not a fake IC (step 532)

If the impedance is not equal to a third predetermined value? (step 530), the method ends.

To supplement the present disclosure, this application incorporates entirely by reference the following commonly assigned patents, patent application publications, and patent applications:

U.S. Pat. Nos. 6,832,725; 7,128,266;
7,159,783; 7,413,127;
7,726,575; 8,294,969;
8,317,105; 8,322,622;
8,366,005; 8,371,507;
8,376,233; 8,381,979;
8,390,909; 8,408,464;
8,408,468; 8,408,469;
8,424,768; 8,448,863;
8,457,013; 8,459,557;
8,469,272; 8,474,712;
8,479,992; 8,490,877;
8,517,271; 8,523,076;
8,528,818; 8,544,737;
8,548,242; 8,548,420;
8,550,335; 8,550,354;

8,550,357; 8,556,174;
8,556,176; 8,556,177;
8,559,767; 8,599,957;
8,561,895; 8,561,903;
8,561,905; 8,565,107;
8,571,307; 8,579,200;
8,583,924; 8,584,945;
8,587,595; 8,587,697;
8,588,869; 8,590,789;
8,596,539; 8,596,542;
8,596,543; 8,599,271;
8,599,957; 8,600,158;
8,600,167; 8,602,309;
8,608,053; 8,608,071;
8,611,309; 8,615,487;
8,616,454; 8,621,123;
8,622,303; 8,628,013;
8,628,015; 8,628,016;
8,629,926; 8,630,491;
8,635,309; 8,636,200;
8,636,212; 8,636,215;
8,636,224; 8,638,806;
8,640,958; 8,640,960;
8,643,717; 8,646,692;
8,646,694; 8,657,200;
8,659,397; 8,668,149;
8,678,285; 8,678,286;
8,682,077; 8,687,282;
8,692,927; 8,695,880;
8,698,949; 8,717,494;
8,717,494; 8,720,783;
8,723,804; 8,723,904;
8,727,223; 8,740,082;
8,740,085; 8,746,563;
8,750,445; 8,752,766;
8,756,059; 8,757,495;
8,760,563; 8,763,909;
8,777,108; 8,777,109;
8,779,898; 8,781,520;
8,783,573; 8,789,757;
8,789,758; 8,789,759;
8,794,520; 8,794,522;
8,794,525; 8,794,526;
8,798,367; 8,807,431;
8,807,432; 8,820,630;
8,822,848; 8,824,692;
8,824,696; 8,842,849;
8,844,822; 8,844,823;
8,849,019; 8,851,383;
8,854,633; 8,866,963;
8,868,421; 8,868,519;
8,868,802; 8,868,803;
8,870,074; 8,879,639;
8,880,426; 8,881,983;
8,881,987; 8,903,172;
8,908,995; 8,910,870;
8,910,875; 8,914,290;
8,914,788; 8,915,439;
8,915,444; 8,916,789;
8,918,250; 8,918,564;
8,925,818; 8,939,374;
8,942,480; 8,944,313;
8,944,327; 8,944,332;
8,950,678; 8,967,468;
8,971,346; 8,976,030;
8,976,368; 8,978,981;
8,978,983; 8,978,984;
8,985,456; 8,985,457;
8,985,459; 8,985,461;
8,988,578; 8,988,590;
8,991,704; 8,996,194;
8,996,384; 9,002,641;
9,007,368; 9,010,641;
9,015,513; 9,016,576;
9,022,288; 9,030,964;
9,033,240; 9,033,242;
9,036,054; 9,037,344;
9,038,911; 9,038,915;
9,047,098; 9,047,359;
9,047,420; 9,047,525;
9,047,531; 9,053,055;
9,053,378; 9,053,380;
9,058,526; 9,064,165;
9,064,165; 9,064,167;
9,064,168; 9,064,254;
9,066,032; 9,070,032;
9,076,459; 9,079,423;
9,080,856; 9,082,023;
9,082,031; 9,084,032;
9,087,250; 9,092,681;
9,092,682; 9,092,683;
9,093,141; 9,098,763;
9,104,929; 9,104,934;
9,107,484; 9,111,159;
9,111,166; 9,135,483;
9,137,009; 9,141,839;
9,147,096; 9,148,474;
9,158,000; 9,158,340;
9,158,953; 9,159,059;
9,165,174; 9,171,543;
9,183,425; 9,189,669;
9,195,844; 9,202,458;
9,208,366; 9,208,367;
9,219,836; 9,224,024;
9,224,027; 9,230,140;
9,235,553; 9,239,950;
9,245,492; 9,248,640;
9,250,652; 9,250,712;
9,251,411; 9,258,033;
9,262,633; 9,262,660;
9,262,662; 9,269,036;
9,270,782; 9,274,812;
9,275,388; 9,277,668;
9,280,693; 9,286,496;
9,298,964; 9,301,427;
9,313,377; 9,317,037;
9,319,548; 9,342,723;
9,361,882; 9,365,381;
9,373,018; 9,375,945;
9,378,403; 9,383,848;
9,384,374; 9,390,304;
9,390,596; 9,411,386;
9,412,242; 9,418,269;
9,418,270; 9,465,967;
9,423,318; 9,424,454;
9,436,860; 9,443,123;
9,443,222; 9,454,689;
9,464,885; 9,465,967;
9,478,983; 9,481,186;
9,487,113; 9,488,986;
9,489,782; 9,490,540;
9,491,729; 9,497,092;
9,507,974; 9,519,814;
9,521,331; 9,530,038;

9,572,901; 9,558,386;
9,606,581; 9,646,189;
9,646,191; 9,652,648;
9,652,653; 9,656,487;
9,659,198; 9,680,282;
9,697,401; 9,701,140;
U.S. Design Pat. No. D702,237;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D734,339;
U.S. Design Pat. No. D737,321;
U.S. Design Pat. No. D754,205;
U.S. Design Pat. No. D754,206;
U.S. Design Pat. No. D757,009;
U.S. Design Pat. No. D760,719;
U.S. Design Pat. No. D762,604;
U.S. Design Pat. No. D766,244;
U.S. Design Pat. No. D777,166;
U.S. Design Pat. No. D771,631;
U.S. Design Pat. No. D783,601;
U.S. Design Pat. No. D785,617;
U.S. Design Pat. No. D785,636;
U.S. Design Pat. No. D790,505;
U.S. Design Pat. No. D790,546;
International Publication No. 2013/163789;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0194692;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0332996;
U.S. Patent Application Publication No. 2014/0001267;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131443;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0191684;
U.S. Patent Application Publication No. 2014/0191913;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0231500;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0332590;
U.S. Patent Application Publication No. 2014/0351317;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0009338;
U.S. Patent Application Publication No. 2015/0014416;
U.S. Patent Application Publication No. 2015/0021397;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;

U.S. Patent Application Publication No. 2015/0049347;
U.S. Patent Application Publication No. 2015/0051992;
U.S. Patent Application Publication No. 2015/0053769;
U.S. Patent Application Publication No. 2015/0062366;
U.S. Patent Application Publication No. 2015/0063215;
U.S. Patent Application Publication No. 2015/0088522;
U.S. Patent Application Publication No. 2015/0096872;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0149946;
U.S. Patent Application Publication No. 2015/0161429;
U.S. Patent Application Publication No. 2015/0178523;
U.S. Patent Application Publication No. 2015/0178537;
U.S. Patent Application Publication No. 2015/0178685;
U.S. Patent Application Publication No. 2015/0181109;
U.S. Patent Application Publication No. 2015/0199957;
U.S. Patent Application Publication No. 2015/0210199;
U.S. Patent Application Publication No. 2015/0212565;
U.S. Patent Application Publication No. 2015/0213647;
U.S. Patent Application Publication No. 2015/0220753;
U.S. Patent Application Publication No. 2015/0220901;
U.S. Patent Application Publication No. 2015/0227189;
U.S. Patent Application Publication No. 2015/0236984;
U.S. Patent Application Publication No. 2015/0239348;
U.S. Patent Application Publication No. 2015/0242658;
U.S. Patent Application Publication No. 2015/0248572;
U.S. Patent Application Publication No. 2015/0254485;
U.S. Patent Application Publication No. 2015/0261643;
U.S. Patent Application Publication No. 2015/0264624;
U.S. Patent Application Publication No. 2015/0268971;
U.S. Patent Application Publication No. 2015/0269402;
U.S. Patent Application Publication No. 2015/0288689;
U.S. Patent Application Publication No. 2015/0288896;
U.S. Patent Application Publication No. 2015/0310243;
U.S. Patent Application Publication No. 2015/0310244;
U.S. Patent Application Publication No. 2015/0310389;
U.S. Patent Application Publication No. 2015/0312780;
U.S. Patent Application Publication No. 2015/0327012;
U.S. Patent Application Publication No. 2016/0014251;
U.S. Patent Application Publication No. 2016/0025697;
U.S. Patent Application Publication No. 2016/0026838;
U.S. Patent Application Publication No. 2016/0026839;
U.S. Patent Application Publication No. 2016/0040982;
U.S. Patent Application Publication No. 2016/0042241;
U.S. Patent Application Publication No. 2016/0057230;
U.S. Patent Application Publication No. 2016/0062473;
U.S. Patent Application Publication No. 2016/0070944;
U.S. Patent Application Publication No. 2016/0092805;
U.S. Patent Application Publication No. 2016/0101936;
U.S. Patent Application Publication No. 2016/0104019;
U.S. Patent Application Publication No. 2016/0104274;
U.S. Patent Application Publication No. 2016/0109219;
U.S. Patent Application Publication No. 2016/0109220;
U.S. Patent Application Publication No. 2016/0109224;
U.S. Patent Application Publication No. 2016/0112631;
U.S. Patent Application Publication No. 2016/0112643;
U.S. Patent Application Publication No. 2016/0117627;
U.S. Patent Application Publication No. 2016/0124516;
U.S. Patent Application Publication No. 2016/0125217;
U.S. Patent Application Publication No. 2016/0125342;
U.S. Patent Application Publication No. 2016/0125873;
U.S. Patent Application Publication No. 2016/0133253;
U.S. Patent Application Publication No. 2016/0171597;
U.S. Patent Application Publication No. 2016/0171666;
U.S. Patent Application Publication No. 2016/0171720;
U.S. Patent Application Publication No. 2016/0171775;
U.S. Patent Application Publication No. 2016/0171777;
U.S. Patent Application Publication No. 2016/0174674;
U.S. Patent Application Publication No. 2016/0178479;
U.S. Patent Application Publication No. 2016/0178685;
U.S. Patent Application Publication No. 2016/0178707;
U.S. Patent Application Publication No. 2016/0179132;
U.S. Patent Application Publication No. 2016/0179143;
U.S. Patent Application Publication No. 2016/0179368;
U.S. Patent Application Publication No. 2016/0179378;
U.S. Patent Application Publication No. 2016/0180130;
U.S. Patent Application Publication No. 2016/0180133;
U.S. Patent Application Publication No. 2016/0180136;
U.S. Patent Application Publication No. 2016/0180594;
U.S. Patent Application Publication No. 2016/0180663;
U.S. Patent Application Publication No. 2016/0180678;
U.S. Patent Application Publication No. 2016/0180713;
U.S. Patent Application Publication No. 2016/0185136;
U.S. Patent Application Publication No. 2016/0185291;
U.S. Patent Application Publication No. 2016/0186926;
U.S. Patent Application Publication No. 2016/0188861;
U.S. Patent Application Publication No. 2016/0188939;
U.S. Patent Application Publication No. 2016/0188940;
U.S. Patent Application Publication No. 2016/0188941;
U.S. Patent Application Publication No. 2016/0188942;
U.S. Patent Application Publication No. 2016/0188943;
U.S. Patent Application Publication No. 2016/0188944;
U.S. Patent Application Publication No. 2016/0189076;
U.S. Patent Application Publication No. 2016/0189087;
U.S. Patent Application Publication No. 2016/0189088;
U.S. Patent Application Publication No. 2016/0189092;
U.S. Patent Application Publication No. 2016/0189284;
U.S. Patent Application Publication No. 2016/0189288;
U.S. Patent Application Publication No. 2016/0189366;
U.S. Patent Application Publication No. 2016/0189443;
U.S. Patent Application Publication No. 2016/0189447;
U.S. Patent Application Publication No. 2016/0189489;
U.S. Patent Application Publication No. 2016/0192051;
U.S. Patent Application Publication No. 2016/0202951;
U.S. Patent Application Publication No. 2016/0202958;
U.S. Patent Application Publication No. 2016/0202959;
U.S. Patent Application Publication No. 2016/0203021;
U.S. Patent Application Publication No. 2016/0203429;
U.S. Patent Application Publication No. 2016/0203797;
U.S. Patent Application Publication No. 2016/0203820;
U.S. Patent Application Publication No. 2016/0204623;
U.S. Patent Application Publication No. 2016/0204636;
U.S. Patent Application Publication No. 2016/0204638;
U.S. Patent Application Publication No. 2016/0227912;
U.S. Patent Application Publication No. 2016/0232891;
U.S. Patent Application Publication No. 2016/0292477;
U.S. Patent Application Publication No. 2016/0294779;
U.S. Patent Application Publication No. 2016/0306769;
U.S. Patent Application Publication No. 2016/0314276;
U.S. Patent Application Publication No. 2016/0314294;
U.S. Patent Application Publication No. 2016/0316190;
U.S. Patent Application Publication No. 2016/0323310;
U.S. Patent Application Publication No. 2016/0325677;
U.S. Patent Application Publication No. 2016/0327614;
U.S. Patent Application Publication No. 2016/0327930;

U.S. Patent Application Publication No. 2016/0328762;
U.S. Patent Application Publication No. 2016/0330218;
U.S. Patent Application Publication No. 2016/0343163;
U.S. Patent Application Publication No. 2016/0343176;
U.S. Patent Application Publication No. 2016/0364914;
U.S. Patent Application Publication No. 2016/0370220;
U.S. Patent Application Publication No. 2016/0372282;
U.S. Patent Application Publication No. 2016/0373847;
U.S. Patent Application Publication No. 2016/0377414;
U.S. Patent Application Publication No. 2016/0377417;
U.S. Patent Application Publication No. 2017/0010141;
U.S. Patent Application Publication No. 2017/0010328;
U.S. Patent Application Publication No. 2017/0010780;
U.S. Patent Application Publication No. 2017/0016714;
U.S. Patent Application Publication No. 2017/0018094;
U.S. Patent Application Publication No. 2017/0046603;
U.S. Patent Application Publication No. 2017/0047864;
U.S. Patent Application Publication No. 2017/0053146;
U.S. Patent Application Publication No. 2017/0053147;
U.S. Patent Application Publication No. 2017/0053647;
U.S. Patent Application Publication No. 2017/0055606;
U.S. Patent Application Publication No. 2017/0060316;
U.S. Patent Application Publication No. 2017/0061961;
U.S. Patent Application Publication No. 2017/0064634;
U.S. Patent Application Publication No. 2017/0083730;
U.S. Patent Application Publication No. 2017/0091502;
U.S. Patent Application Publication No. 2017/0091706;
U.S. Patent Application Publication No. 2017/0091741;
U.S. Patent Application Publication No. 2017/0091904;
U.S. Patent Application Publication No. 2017/0092908;
U.S. Patent Application Publication No. 2017/0094238;
U.S. Patent Application Publication No. 2017/0098947;
U.S. Patent Application Publication No. 2017/0100949;
U.S. Patent Application Publication No. 2017/0108838;
U.S. Patent Application Publication No. 2017/0108895;
U.S. Patent Application Publication No. 2017/0118355;
U.S. Patent Application Publication No. 2017/0123598;
U.S. Patent Application Publication No. 2017/0124369;
U.S. Patent Application Publication No. 2017/0124396;
U.S. Patent Application Publication No. 2017/0124687;
U.S. Patent Application Publication No. 2017/0126873;
U.S. Patent Application Publication No. 2017/0126904;
U.S. Patent Application Publication No. 2017/0139012;
U.S. Patent Application Publication No. 2017/0140329;
U.S. Patent Application Publication No. 2017/0140731;
U.S. Patent Application Publication No. 2017/0147847;
U.S. Patent Application Publication No. 2017/0150124;
U.S. Patent Application Publication No. 2017/0169198;
U.S. Patent Application Publication No. 2017/0171035;
U.S. Patent Application Publication No. 2017/0171703;
U.S. Patent Application Publication No. 2017/0171803;
U.S. Patent Application Publication No. 2017/0180359;
U.S. Patent Application Publication No. 2017/0180577;
U.S. Patent Application Publication No. 2017/0181299;
U.S. Patent Application Publication No. 2017/0190192;
U.S. Patent Application Publication No. 2017/0193432;
U.S. Patent Application Publication No. 2017/0193461;
U.S. Patent Application Publication No. 2017/0193727;
U.S. Patent Application Publication No. 2017/0199266;
U.S. Patent Application Publication No. 2017/0200108; and
U.S. Patent Application Publication No. 2017/0200275.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A printer, comprising:
a thermal print head;
an authentication encryption integrated circuit (IC) associated with the thermal print head; and
an impedance control system, coupled to the thermal print head and authentication encryption integrated circuit (IC), configured to measure an impedance of one or more points of the thermal print head and the authentication encryption integrated circuit (IC),
wherein, based on the measured impedance, measured at start-up and measured over a time period, the impedance control system determines whether the thermal print head is authorized or not,
wherein, at start-up, if the measured impedance is equal to a predetermined value, the thermal print head is authorized; and
wherein, at start-up, if the measured impedance is not equal to the predetermined value, and if an impedance measurement condition is not completed, the impedance control system repeats the impedance measurement but if the impedance measurement condition is completed, the thermal print head is not authorized and the impedance control system prevents a printing operation.

2. The printer according to claim 1,
wherein, if variations of the measured impedance over the time period exceed a threshold, then the thermal print head is not authorized.

3. The printer according to claim 1,
wherein, the impedance control system measures the impedance at a fixed periodicity and/or one or more events.

4. The printer according to claim 1,
wherein, the one or more points of the thermal print head comprises thermal printer head power (VCC), authentication IC data line, and thermal print head data lines.

5. A printer, comprising:
a thermal print head;
an authentication encryption integrated circuit (IC) associated with the thermal print head; and
an impedance control system, coupled to the thermal print head and authentication encryption integrated circuit (IC), configured to measure an impedance of one or more points of the thermal print head and the authentication encryption integrated circuit (IC),
wherein, based on the measured impedance, measured at start-up and measured over a time period, the impedance control system determines whether the thermal print head is authorized or not,
wherein, at start-up, if the measured impedance is equal to a predetermined value, the thermal print head is authorized;
wherein, if a first impedance of internal circuitry for the authentication encryption integrated circuit (IC) is R and a second impedance of internal circuitry for one of the one or more points of the thermal print head is R, and the first internal circuitry and second internal circuitry are coupled in parallel, then the predetermined value is R/2±a margin, and
wherein, if the measured impedance is not R/2±a margin, then the thermal print head is not authorized and the impedance control system prevents a printing operation.

6. The printer according to claim 5,
wherein, if variations of the measured impedance over the time period exceed a threshold, then the thermal print head is not authorized.

7. The printer according to claim 5,
wherein, the impedance control system measures the impedance at a fixed periodicity and/or one or more events.

8. The printer according to claim 5,
wherein, the one or more points of the thermal print head comprises thermal printer head power (VCC), authentication IC data line, and thermal print head data lines.

9. A printer, comprising:
a thermal print head;
an authentication encryption integrated circuit (IC) associated with the thermal print head; and
an impedance control system, coupled to the thermal print head and authentication encryption integrated circuit (IC), configured to measure an impedance of one or more points of the thermal print head and the authentication encryption integrated circuit (IC),
wherein, based on the measured impedance, measured at start-up and measured over a time period, the impedance control system determines whether the thermal print head is authorized or not,
wherein, if the impedance measurement is not completed, the impedance control system repeats the impedance measurement, and
wherein, if the impedance control system determines the thermal print head is not authorized, the impedance control system then prevents a printing operation.

10. The printer according to claim 9,
wherein, at start-up, if the measured impedance is equal to a predetermined value, the thermal print head is authorized.

11. The printer according to claim 9,
wherein, at start-up, if the measured impedance is not equal to the predetermined value, and if an impedance measurement condition is completed, the thermal print head is not authorized and the impedance control system prevents the printing operation.

12. The printer according to claim 9,
wherein, if variations of the measured impedance over the time period exceed a threshold, then the thermal print head is not authorized.

13. The printer according to claim 9,
wherein, the impedance control system measures the impedance at a fixed periodicity and/or one or more events.

14. The printer according to claim 9,
wherein, the one or more points of the thermal print head comprises thermal printer head power (VCC), authentication IC data line, and thermal print head data lines.

* * * * *